US008859165B2

(12) United States Patent
Zhang et al.

(10) Patent No.: US 8,859,165 B2
(45) Date of Patent: *Oct. 14, 2014

(54) MEMBRANE ELECTRODE ASSEMBLY AND FUEL CELL USING THE SAME

(75) Inventors: Li-Na Zhang, Beijing (CN); Kai-Li Jiang, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 157 days.

This patent is subject to a terminal disclaimer.

(21) Appl. No.: 12/384,942

(22) Filed: Apr. 9, 2009

(65) Prior Publication Data

US 2010/0021797 A1  Jan. 28, 2010

(30) Foreign Application Priority Data

Jul. 25, 2008  (CN) .......................... 2008 1 0142524
Dec. 17, 2008  (CN) .......................... 2008 1 0241834

(51) Int. Cl.
*H01M 4/02* (2006.01)
*H01M 4/36* (2006.01)
*H01M 8/10* (2006.01)

(52) U.S. Cl.
USPC ........................................ 429/523; 429/480

(58) Field of Classification Search
None
See application file for complete search history.

(56) References Cited

U.S. PATENT DOCUMENTS

| 6,528,200 | B1 * | 3/2003 | Yoshitake et al. ............ 429/480 |
| 6,616,495 | B1 | 9/2003 | Tsuboi |
| 6,761,990 | B1 * | 7/2004 | Yoshitake et al. ............ 429/454 |
| 6,818,338 | B2 * | 11/2004 | Kubota et al. ................ 429/434 |
| 6,887,451 | B2 | 5/2005 | Dodelet et al. |
| 6,933,067 | B2 | 8/2005 | Kawahara et al. |
| 7,045,108 | B2 | 5/2006 | Jiang et al. |
| 7,704,480 | B2 | 4/2010 | Jiang et al. |
| 2002/0049134 | A1 * | 4/2002 | Imazato ....................... 502/101 |
| 2002/0197525 | A1 | 12/2002 | Tomita et al. |
| 2004/0053053 | A1 | 3/2004 | Jiang et al. |
| 2004/0053780 | A1 | 3/2004 | Jiang et al. |
| 2005/0197246 | A1 | 9/2005 | Yoshida et al. |

(Continued)

FOREIGN PATENT DOCUMENTS

CN  1479949 A  3/2004
CN  1734812 A  2/2006

(Continued)

OTHER PUBLICATIONS

The definition of "end to end", in The American Heritage® Dictionary of Idioms, 2007, retrieved from http://www.credoreference.com/entry/hmidiom/end_to_end on May 8, 2013.*

(Continued)

*Primary Examiner* — Cynthia K. Walls
(74) *Attorney, Agent, or Firm* — Novak Druce Connolly Bove + Quigg LLP

(57) ABSTRACT

A membrane electrode assembly includes a proton exchange membrane and at least one electrode. The at least one electrode includes a carbon nanotube composite structure. The carbon nanotube composite structure includes a carbon nanotube structure and a catalyst material. The carbon nanotube structure includes a plurality of carbon nanotubes and the catalyst material is dispersed on the carbon nanotubes. A fuel cell using the membrane electrode assembly is also provided.

13 Claims, 16 Drawing Sheets

(56) References Cited

U.S. PATENT DOCUMENTS

| | | |
|---|---|---|
| 2006/0116284 A1 | 6/2006 | Pak et al. |
| 2006/0183300 A1 | 8/2006 | Mosdale et al. |
| 2007/0218345 A1 | 9/2007 | Sakai et al. |
| 2007/0231673 A1 | 10/2007 | Noh |
| 2007/0237952 A1 | 10/2007 | Jiang et al. |
| 2007/0237959 A1 | 10/2007 | Lemaire |
| 2007/0243449 A1* | 10/2007 | Sotomura et al. |
| 2008/0044722 A1* | 2/2008 | Mohamadinejad et al. .. 502/101 |
| 2008/0095694 A1 | 4/2008 | Nakayama et al. |
| 2008/0223516 A1 | 9/2008 | Tanuma |
| 2008/0248235 A1 | 10/2008 | Feng et al. |
| 2008/0299031 A1 | 12/2008 | Liu et al. |
| 2009/0208708 A1 | 8/2009 | Wei et al. |
| 2009/0305113 A1 | 12/2009 | Minteer et al. |
| 2010/0255402 A1 | 10/2010 | Heo et al. |

FOREIGN PATENT DOCUMENTS

| | | |
|---|---|---|
| CN | 1912200 | 2/2007 |
| CN | 1948144 | 4/2007 |
| CN | 1960943 A | 5/2007 |
| CN | 101024495 | 8/2007 |
| CN | 100400470 | 7/2008 |
| CN | 100411979 | 8/2008 |
| CN | 101239712 | 8/2008 |
| CN | 101284662 | 10/2008 |
| CN | 101314464 | 12/2008 |
| EP | 1777195 A1 | 4/2007 |
| EP | 1777195 A8 | 4/2007 |
| JP | 2002-343379 | 11/2002 |
| JP | 2004-103403 | 4/2004 |
| JP | 2004-146226 | 5/2004 |
| JP | 2004-207231 | 7/2004 |
| JP | 2004-363018 | 12/2004 |
| JP | 2005-324086 | 11/2005 |
| JP | 2006-80083 | 3/2006 |
| JP | 2008059841 | 3/2008 |
| TW | 200524201 | 7/2005 |
| TW | I238555 | 8/2005 |
| TW | 200722368 | 6/2007 |
| TW | 200724486 | 7/2007 |
| WO | WO2007052650 | 5/2007 |
| WO | WO2007084249 | 7/2007 |

OTHER PUBLICATIONS

Zhang, Spinning and processing continuous yarns from 4-inch wafer scale super-aligned carbon nanotube arrays, Advanced Materials, 2006, 18, 1505-1510.*

Effective adhesion of Pt nanoparticles on thiolated multi-wailed carbon nanotubes and their use for fabricating electrocatalysts, Guang-Wu Yang et al., Carbon, vol. 45, p. 3036-3041(2007).

G.J.K. Acres, Recent advances in fuel cell technology and its application, Journal of Power Sources, V100, p. 60-66 (2001).

Mei Zhang et al., Strong, Transparent, Multifunctional, Cartoon Nanotube Sheets, Science, vol. 309, p. 1215-1219 2005).

Fan et al. "Explorations on growth mechanism, controlled synthesis and applications of carbon nanotubes", Dec. 31, 2006, Physics, vol. 35, p. 376-381. Paragraph 2 of Left col. of p. 379 to Paragraph 2 of Right col. of p. 379 may be relevant.

Wu et al. "Transparent,Conductive Carbon nanotube Films" Science, 2004,08, vol. 305, p. 1273-1276. Paragraph 1 and Paragraph 2 of col. 3 of p. 1273 and Fig. 1D may be relevant.

Zhang et al. "Spinning and Processing Continuous Yarns from 4-Inch Wafer Scale Super-Aligned Carbon Nanotube Arrays" Advanced Materials, 2006, vol. 18, p. 1505-1510.Fig. 1 and Fig. 2 may be relevant.

Xin Wang, CNT-Based Electrodes with High Efficiency for PEMFCs, ESSL, 2005, 8(1), A42-A44.

* cited by examiner

US 8,859,165 B2

MEMBRANE ELECTRODE ASSEMBLY AND FUEL CELL USING THE SAME

RELATED APPLICATIONS

This application is related to co-pending applications entitled "MEMBRANE ELECTRODE ASSEMBLY AND BIOFUEL CELL USING THE SAME", U.S. patent application Ser. No.12/384,964, filed Apr. 9, 2009; "MEMBRANE ELECTRODE ASSEMBLY AND BIOFUEL CELL USING THE SAME", U.S. patent application Ser. No.12/384,963, filed Apr. 9, 2009; and "MEMBRANE ELECTRODE ASSEMBLY AND FUEL CELL USING THE SAME", U.S. patent application Ser. No.12/384,931,filed Apr. 9, 2009; the disclosures of the above-identified applications are incorporated herein by reference. The application is also related to co-pending applications entitled "MEMBRANE ELECTRODE ASSEMBLY AND METHOD FOR MAKING THE SAME", U.S. patent application Ser No. 12/006,309,filed Dec. 29, 2007 ; "MEMBRANE ELECTRODE ASSEMBLY AND METHOD FOR MAKING THE SAME", U.S. patent application Ser. No. 12/006,336, filed Dec. 29, 2007 ; "MEMBRANE ELECTRODE ASSEMBLY AND METHOD FOR MAKING THE SAME", U.S. patent application Ser. No. 12/200,338, filed Aug. 28, 2008.

BACKGROUND

1. Technical Field

The disclosure generally relates to membrane electrode assemblies and fuel cell using the same, and particularly, to a membrane electrode assembly based on carbon nanotubes and a fuel cell using the same.

2. Description of Related Art

Fuel cells can generally be classified into alkaline, solid oxide, and proton exchange membrane fuel cells. The proton exchange membrane fuel cell has received increasingly more attention and has developed rapidly in recent years. Typically, the proton exchange membrane fuel cell includes a number of separated fuel cell work units. Each work unit includes a fuel cell membrane electrode assembly (MEA), flow field plates (FFP), current collector plates (CCP), as well as related support equipments, such as blowers, valves, and pipelines.

Referring to FIG. 12, the MEA 50 generally includes a proton exchange membrane 51 and two electrodes 54 located adjacent to two opposite surfaces of the proton exchange membrane 51 according to the prior art. Furthermore, each electrode 54 includes a catalyst layer 52 and a diffusion layer 53. The catalyst layer 52 is sandwiched between the diffusion layer 53 and the proton exchange membrane 51. The proton exchange membrane 51 is typically made of a material selected from the group consisting of erfluorosulfonic acid, polystyrene sulfonic acid, polystyrene trifluoroacetic acid, phenol formaldehyde resin acid, and hydrocarbons. The catalyst layer 52 includes catalyst materials and carriers. The catalyst materials can be metal particles, such as platinum particles, gold particles, ruthenium particles or combinations thereof. The carriers are generally carbon particles, such as graphite, carbon black, carbon fiber or carbon nanotubes. The diffusion layer 53 is constituted of carbon fiber paper.

However, the carbon fiber paper has the following disadvantages. Firstly, the carbon fibers in the carbon fiber paper are not uniformly dispersed, and therefore, the micropores therein defined by the carbon fibers are not uniform. Thus, such structure prevents the diffusion layer from uniformly diffusing the gases that are needed for the MEA. Secondly, the carbon fiber paper has high electrical resistance, thereby the travel of electrons between the diffusion layer and the external electrical circuit is restricted. As a result, the reaction activity of the MEA is reduced.

What is needed, therefore, are a membrane electrode assembly and a fuel cell using the same having improved reaction activity.

BRIEF DESCRIPTION OF THE DRAWINGS

Many aspects of the present membrane electrode assembly and fuel cell using the same can be better understood with references to the following drawings. The components in the drawings are not necessarily drawn to scale, the emphasis instead being placed upon clearly illustrating the principles of the present membrane electrode assembly and fuel cell using the same.

Figure 1:
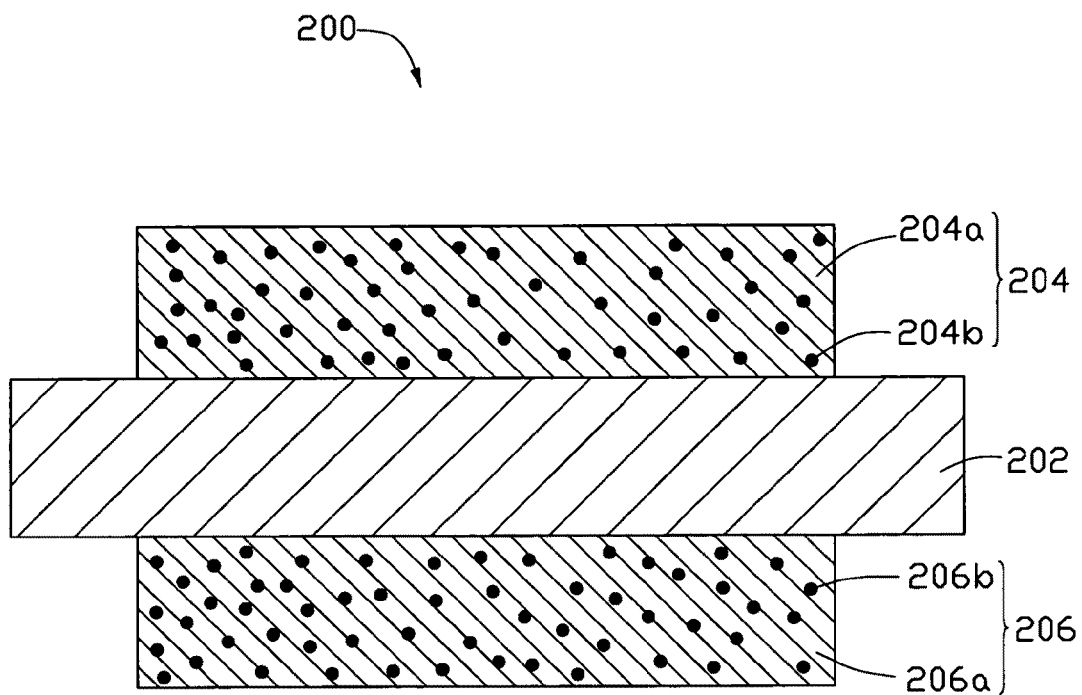
FIG. 1 is a schematic view of a membrane electrode assembly in accordance with an embodiment.

Corresponding reference characters indicate corresponding parts throughout the several views. The exemplifications set out herein illustrate at least one present embodiment of the membrane electrode assembly and fuel cell using the same, in at least one form, and such exemplifications are not to be construed as limiting the scope of the disclosure in any manner.

DETAILED DESCRIPTION

References will now be made to the drawings, in detail, to describe embodiments of the membrane electrode assembly and fuel cell using the same.

Referring to FIG. 1, a membrane electrode assembly 200 according to one embodiment is shown. The membrane electrode assembly 200 includes a proton exchange membrane 202, a first electrode 204 and a second electrode 206. The proton exchange membrane 202 has two opposite surfaces, a first surface and a second surface. The first electrode 204 is located adjacent to the first surface of the proton exchange membrane 202 and the second electrode 206 is located adjacent to the second surface of the proton exchange membrane 202. The first electrode 204 includes a first diffusion layer 204a and a first catalyst 204b dispersed therein and the second electrode 206 includes a second diffusion layer 206a and a second catalyst 206b dispersed therein.

The first diffusion layer 204a includes a carbon nanotube structure. The carbon nanotube structure includes a plurality of carbon nanotubes distributed uniformly therein. A plurality of carbon nanotubes are arranged orderly or disorderly, entangled or arranged along a primary direction in the carbon nanotube structure. For example, the carbon nanotubes can be entangled with each other, forming a carbon nanotube structure with disordered arrangement of carbon nanotubes. Alternatively, if the carbon nanotube structure includes ordered arrangement of carbon nanotubes, the carbon nanotubes can be primarily oriented along the same direction, or along two or more directions. The carbon nanotubes in the carbon nanotube structure can be selected from a group consisting of single-walled carbon nanotubes, double-walled carbon nanotubes, and/or multi-walled carbon nanotubes. The length of the carbon nanotubes ranges from about 200 to about 900 micrometers in one embodiment.

The carbon nanotube structure can include at least one carbon nanotube film, at least one carbon nanotube wire or combination thereof. The carbon nanotubes of the first diffusion layer 204a can be in the structure of a carbon nanotube film or carbon nanotube wire. In one embodiment, the carbon nanotube structure has an overall planar structure. The carbon nanotube film can be a drawn carbon nanotube film, a pressed carbon nanotube film, or a flocculent carbon nanotube film. The area and the thickness of the carbon nanotube structure are unlimited and could be made according to user's specific needs. The carbon nanotube structure can be a free-standing structure, e.g. the carbon nanotube structure can keep its integrity without the use of a supporter.

Figure 2:
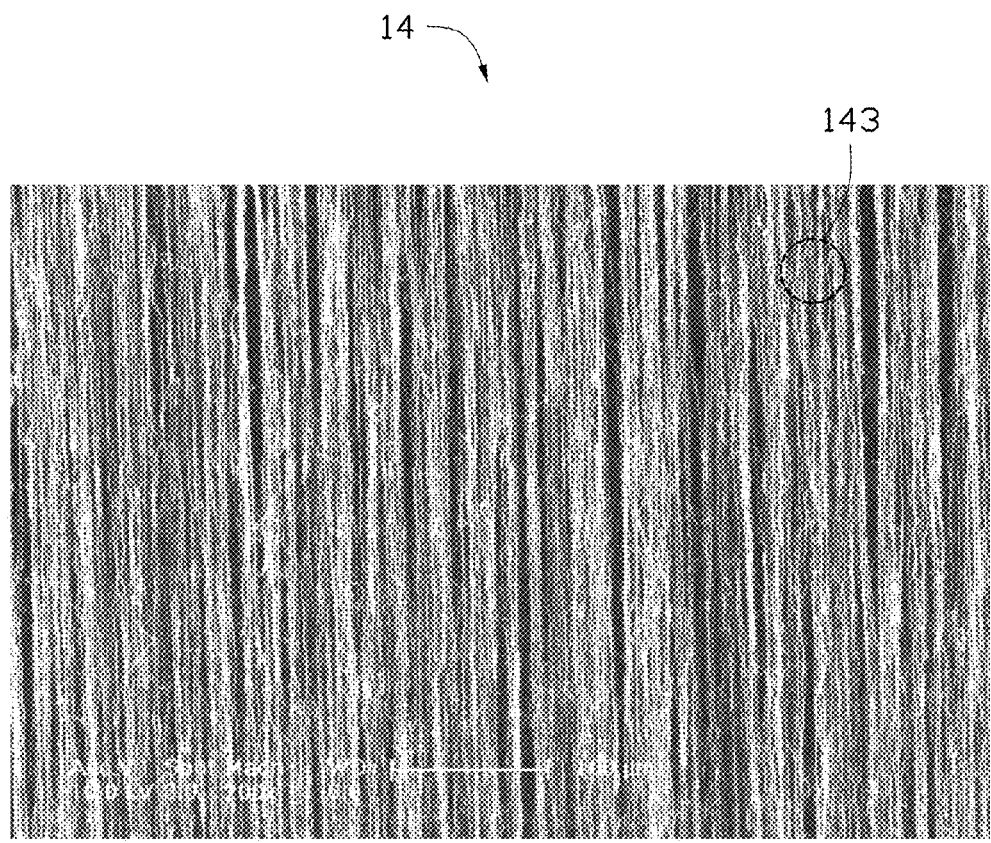
FIG. 2 is a Scanning Electron Microscope (SEM) image of a drawn carbon nanotube film.
Figure 3A:
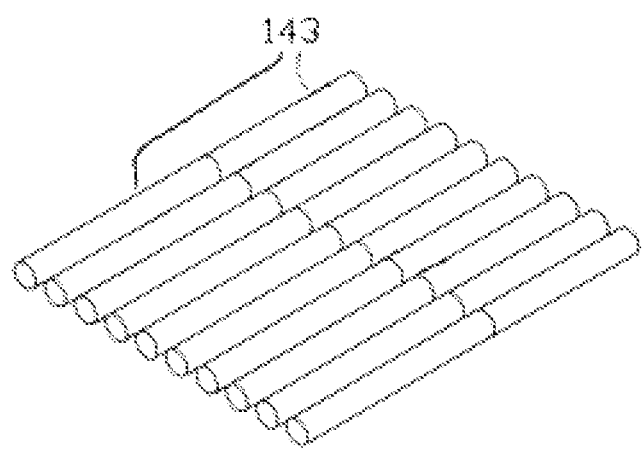
FIG. 3A is a schematic view of carbon nanotube segments of the drawn carbon nanotube film of FIG. 2 joined end to end.
Figure 3B:
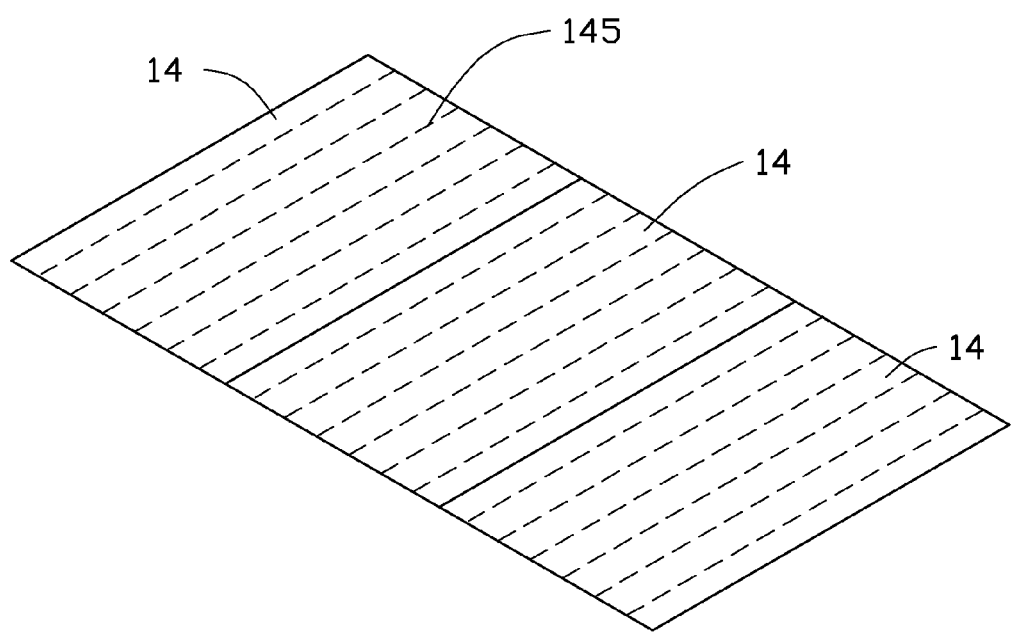
FIG. 3B shows the drawn carbon nanotube films are situated side-by-side to increase the area of the carbon nanotube structure.
Figure 3C:
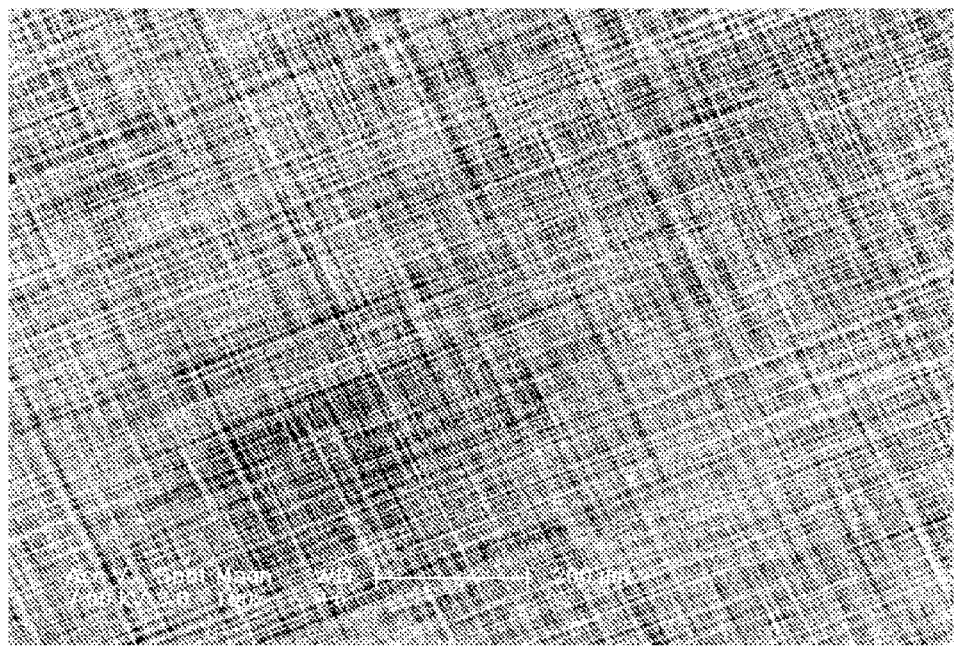
FIG. 3C shows an SEM image of one embodiment of a carbon nanotube film structure including include at least two stacked drawn carbon nanotube films.
Figure 3D:
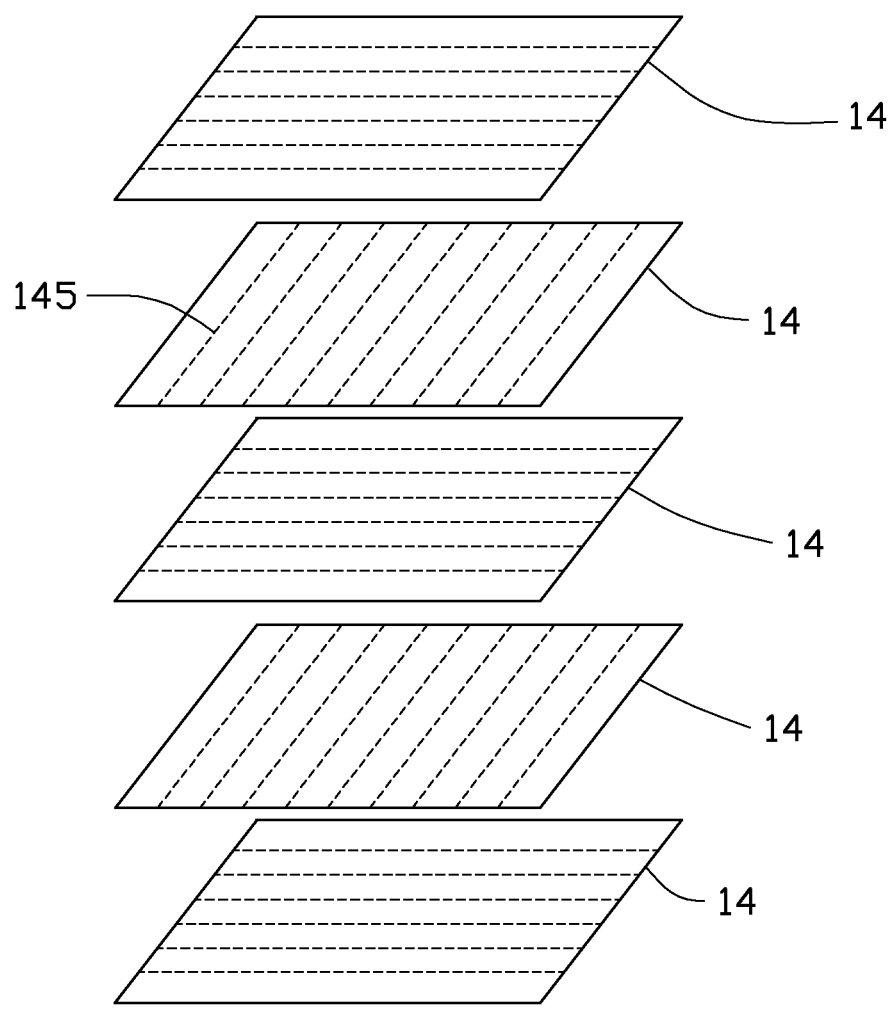
FIG. 3D is an exploded, isometric view of the carbon nanotube film structure of FIG. 3C.
Figure 3E:
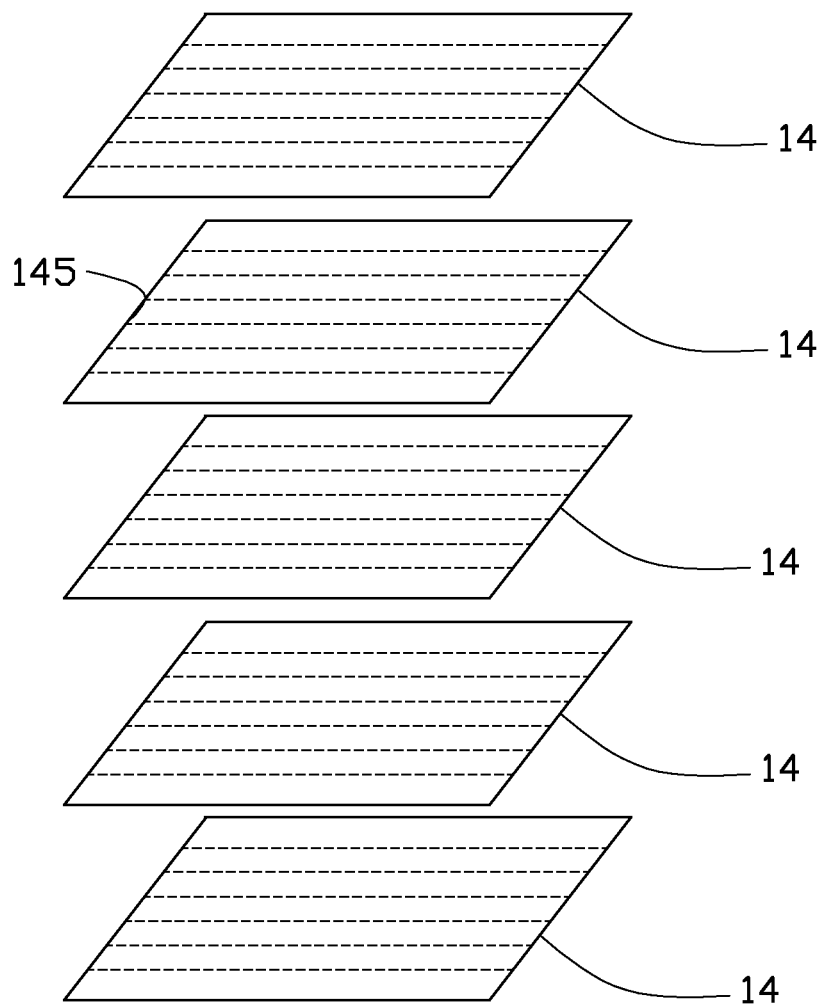
FIG. 3E is an exploded, isometric view of another embodiment a carbon nanotube film structure.

In one embodiment, the carbon nanotube structure includes one drawn carbon nanotube film. Referring to FIGS. 2, and 3A, each drawn carbon nanotube film includes a plurality of successively oriented carbon nanotube segments 143 joined end-to-end by van der Waals attractive force therebetween. One example of carbon nanotube segments 143 joined end-to-end when drawing the carbon nanotube film is described in the article, "Spinning and processing continuous yarns from 4-inch wafer scale super aligned carbon nanotube arrays,"(Adv. Mater. 2006, 18, 1505-1510, 2006 Wiley-VCH Verlag GmbH & Co KGaA, Weinheim), incorporated herein by reference. Each carbon nanotube segment 143 includes a plurality of carbon nanotubes 145 parallel to each other, and combined by van der Waals attractive force therebetween. The carbon nanotube segments 143 can vary in width, thickness, uniformity and shape. The carbon nanotubes 145 in the drawn carbon nanotube film are also typically oriented along a preferred orientation.

The drawn carbon nanotube film 14 can be pulled out from a super-aligned carbon nanotube array 144 on a substrate. A width and a length of the drawn carbon nanotube film 14 are dependent on a size of the carbon nanotube array 144. In one embodiment, if the substrate is a 4-inch P-type silicon wafer, the width of the drawn carbon nanotube film 14 is in a range from about 0.5 nanometers to about 10 centimeters, and the thickness of the drawn carbon nanotube film 14 is in a range from about 0.5 nanometers to about 100 micrometers. The length of the carbon nanotube film drawn 14 from a 4-inch P-type silicon wafer can be greater than 10 meters.

Referring from FIG. 3B through FIG. 3E, the carbon nanotube structure includes two or more drawn carbon nanotube films 14. The two or more drawn carbon nanotube films 14 can be situated side-by-side and/or stacked with each other to form a planar carbon nanotube structure. Adjacent drawn carbon nanotube films 14 can be combined with each other by van der Waals attractive force therebetween. An angle α between the preferred orientations of the carbon nanotubes 145 in the two adjacent stacked drawn carbon nanotube films 14 is in a range of 0≤α≤90°. Thus, the carbon nanotube structure includes a plurality of micropores defined by the stacked drawn carbon nanotube films 14. The micropores of one embodiment are distributed in the carbon nanotube structure uniformly. Diameters of the micropores can range from about 1 to about 10 micrometers. The micropores can be used to diffuse the gas. It is to be understood that there can be some variation in the carbon nanotube structure.

Figure 4:
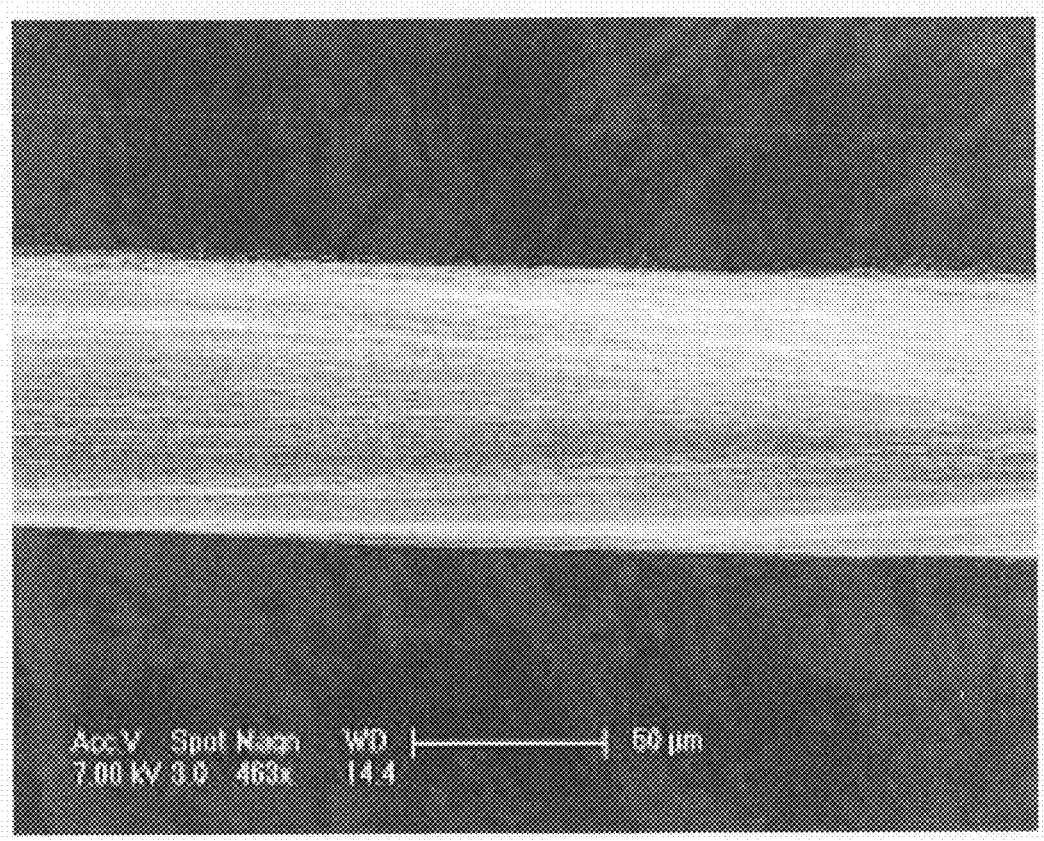
FIG. 4 is a Scanning Electron Microscope (SEM) image of an untwisted carbon nanotube wire.

Further, the carbon nanotube structure can include at least one carbon nanotube wire. A single carbon nanotube wire can be folded, convoluted or otherwise shaped to form the planar carbon nanotube structure. Alternatively the carbon nanotube structure can include a plurality of carbon nanotube wires, the carbon nanotube wires can be located side by side, crossed, or weaved together to form the planar carbon nanotube structure. The carbon nanotube wire can be twisted or untwisted. The untwisted carbon nanotube wire is formed by treating the drawn carbon nanotube film with an organic solvent. Specifically, the drawn carbon nanotube film is treated by applying the organic solvent to the drawn carbon nanotube film so as to soak the entire surface of the drawn carbon nanotube film in the organic solvent. After being soaked by the organic solvent, the adjacent paralleled carbon nanotubes in the drawn carbon nanotube film will be bundled together, due to the surface tension of the organic solvent when the organic solvent volatilizing, and thus, the drawn carbon nanotube film is shrunk into untwisted carbon nanotube wire. The organic solvent is volatile. Referring to FIG. 4, the untwisted carbon nanotube wire includes a plurality of carbon nanotubes substantially oriented along the same direction (e.g., a direction along the length of the untwisted carbon nanotube wire). The carbon nanotubes are parallel to the axis of the untwisted carbon nanotube wire. A length of the untwisted carbon nanotube wire can be set as desired. A diameter of the untwisted carbon nanotube wire can be in a range from about 0.5 nanometers to about 100 micrometers.

Figure 5:
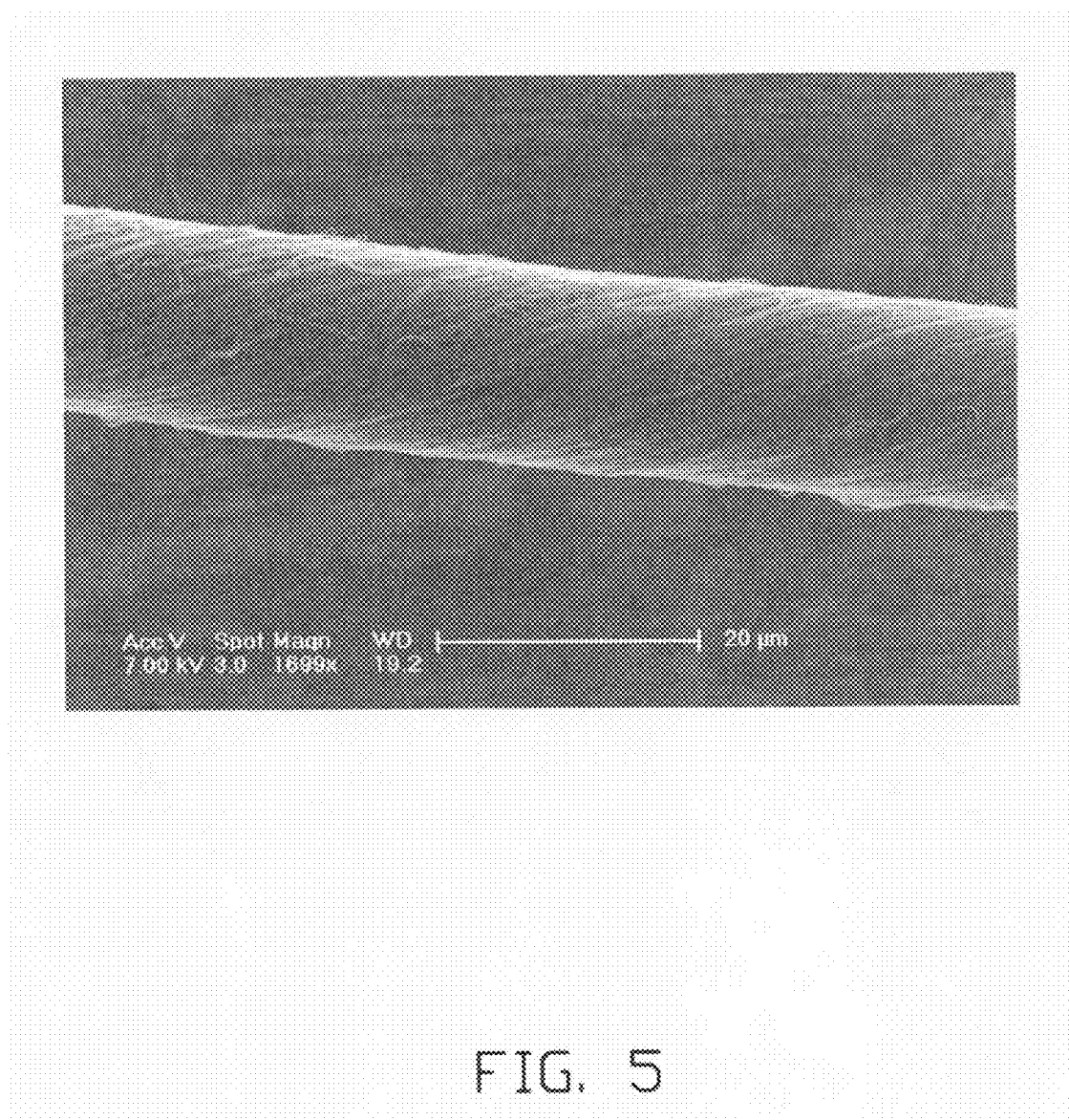
FIG. 5 is a Scanning Electron Microscope (SEM) image of a twisted carbon nanotube wire.

The twisted carbon nanotube wire can be formed by twisting a drawn carbon nanotube film by using a mechanical force to turn two ends of the carbon nanotube film in opposite directions. Referring to FIG. 5, the twisted carbon nanotube wire includes a plurality of carbon nanotubes oriented around an axial direction of the twisted carbon nanotube wire. The carbon nanotubes are aligned around the axis of the carbon nanotube twisted wire like a helix.

Figure 6:
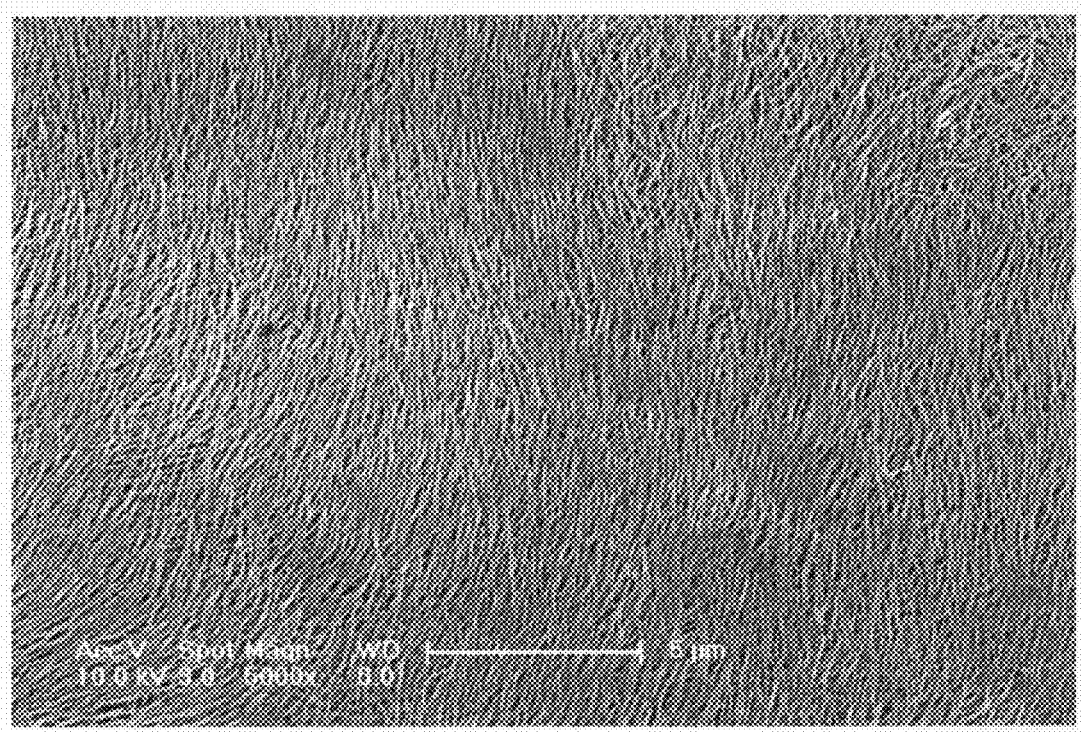
FIG. 6 is a Scanning Electron Microscope (SEM) image of a pressed carbon nanotube film with the carbon nanotubes.
Figure 7:
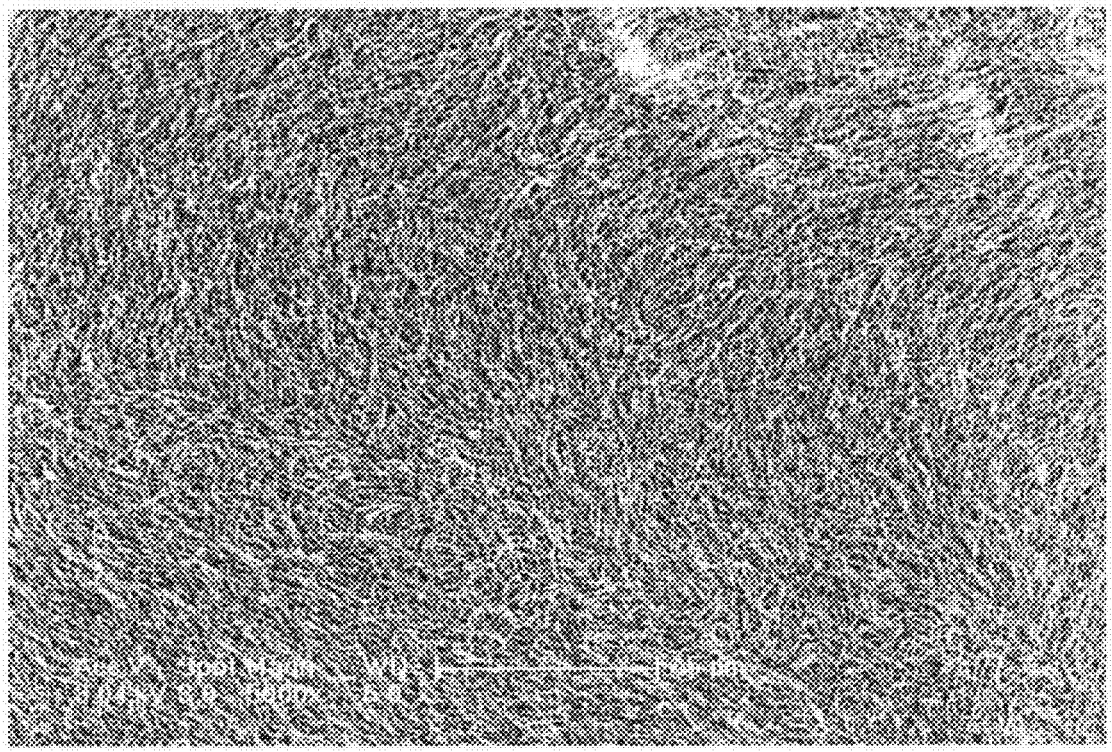
FIG. 7 is a Scanning Electron Microscope (SEM) image of a pressed carbon nanotube film with the carbon nanotubes arranged along two or more directions.

Referring to FIG. 6 and FIG. 7, the carbon nanotube structure can include at least one pressed carbon nanotube film. The pressed carbon nanotube film can be isotropic. The carbon nanotubes in the pressed carbon nanotube film can be substantially arranged along the same direction or arranged along two or more directions as shown in FIG. 7. The carbon nanotubes in the pressed carbon nanotube film can rest upon each other. The adjacent carbon nanotubes are combined and attracted by van der Waals attractive force, thereby forming a free-standing structure after being pressed. An angle between a primary alignment direction of the carbon nanotubes and a base of the pressed carbon nanotube film can be in a range from about 0 degrees to about 15 degrees. The pressed carbon nanotube film can be formed by pressing a carbon nanotube array. The angle is closely related to pressure applied to the carbon nanotube array. The greater the pressure, the smaller the angle. The carbon nanotubes in the pressed carbon nanotube film can be parallel to the surface of the pressed carbon nanotube film when the angle is 0 degrees. A length and a width of the pressed carbon nanotube film can be set as desired. Also, multiple pressed carbon nanotube films can be stated upon one another.

Figure 8:
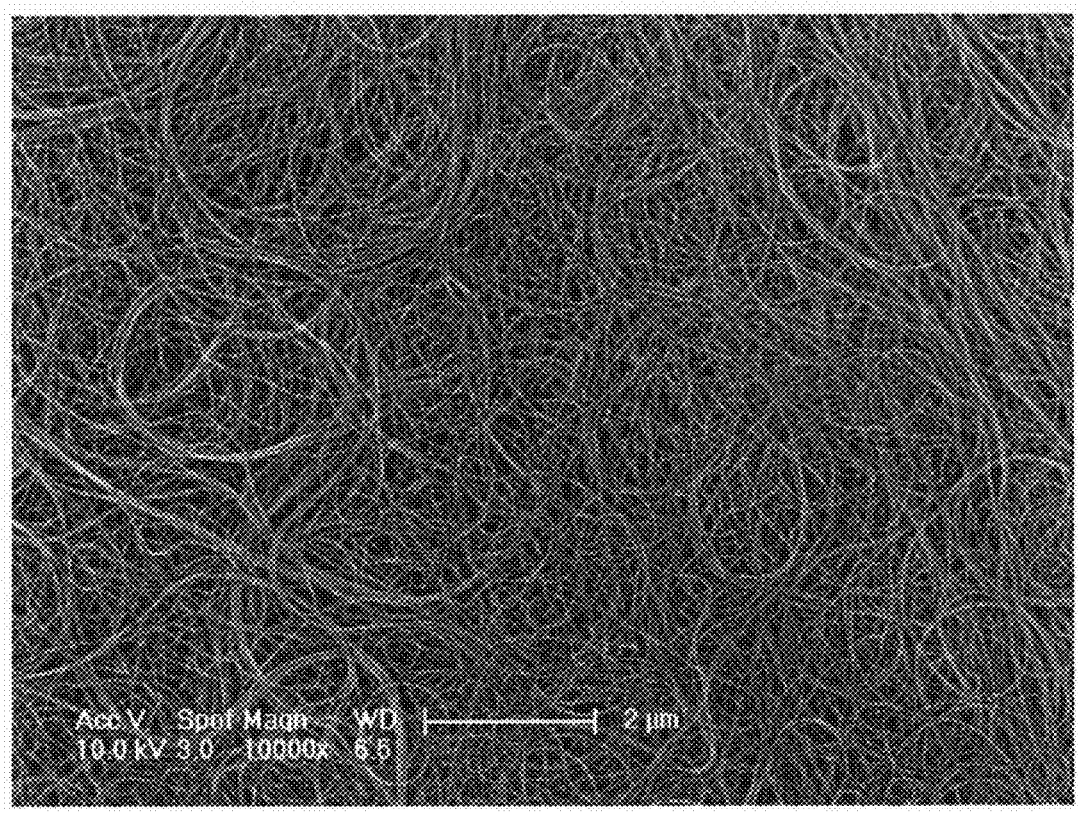
FIG. 8 is a Scanning Electron Microscope (SEM) image of a flocculent carbon nanotube film.

Referring to FIG. 8, the carbon nanotube structure may include at least one flocculent carbon nanotube film. The flocculent carbon nanotube film is formed of a plurality of carbon nanotubes entangled with each other. The length of the carbon nanotubes in the flocculent carbon nanotube film can be larger than 10 micrometers. The adjacent carbon nanotubes are combined and entangled by van der Waals attractive force therebetween, thereby forming a microporous structure. Further, the flocculent carbon nanotube film is isotropic. The sizes of the micropores can be less than 10 micrometers. The micropores can be used to diffuse the gas. The length and a width of the flocculent carbon nanotube film is not limited. In one embodiment, the flocculent carbon nanotube film includes a plurality of long, curved, disordered carbon nanotubes entangled with each other.

The carbon nanotube structure can include other materials, such as a filler thus becoming carbon nanotube composite. The filler can be comprised of a material selected from a group consisting of metal, ceramic, glass, carbon fiber and combinations thereof.

The catalyst 204b, 206b include metal particles. The metal particles can be selected from a group consisting of platinum particles, gold particles, ruthenium particles and combinations thereof. The metal particles are dispersed on surface of the carbon nanotube of the carbon nanotube structure uniformly. The distribution of the metal particles is less than 0.5 milligram per square centimeter. In one embodiment, the metal particles are platinum.

Figure 9:
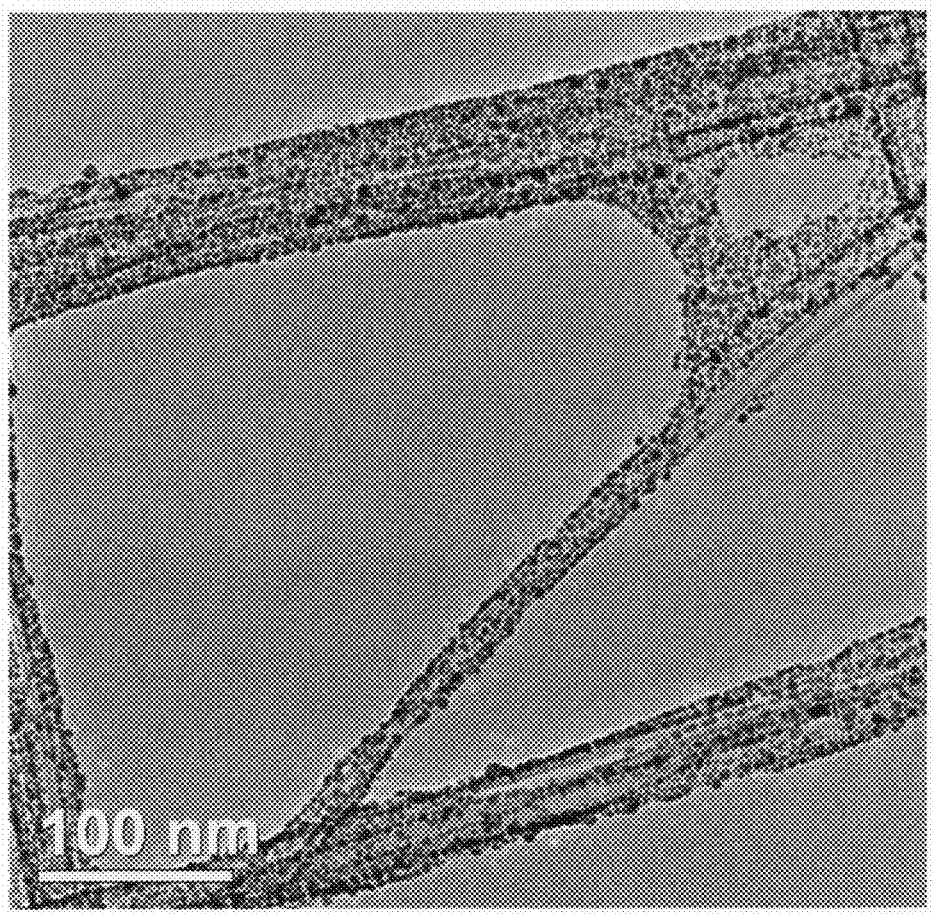
FIG. 9 is a Scanning Electron Microscope (SEM) image of a drawn carbon nanotube film deposited with platinum.

In one embodiment, the carbon nanotube structure includes a plurality of stacked drawn carbon nanotube films. The first electrode 204 is fabricated by the following steps of: (a1) providing two or more drawn carbon nanotube films; (b1) forming a layer of catalyst particles on each drawn carbon nanotube film; (c1) staking the drawn carbon nanotube films to form a carbon nanotube composite structure, thereby obtaining the first electrode 204. In step (b1), the catalyst particles are platinum and they are formed by sputtering. Referring to FIG. 9, the platinum particles are dispersed on the surface of the carbon nanotubes of the drawn carbon nanotube film uniformly. Alternatively, the carbon nanotube structure can include a plurality of carbon nanotube wires weaved together to form the planar carbon nanotube structure. After step (b1), the drawn carbon nanotube film can be rolled or shrunk to form a carbon nanotube wire. A plurality of wires can be weaved to form a planar carbon nanotube composite structure.

The material of the proton exchange membrane 202 can be selected from a group consisting of perfluorosulfonic acid, polystyrene sulfonic acid, polystyrene trifluoroacetic acid, phenol-formaldehyde resin acid, and hydrocarbons. In one embodiment, the second electrode 206 has the same structure with the first electrode 204.

Alternatively, the second electrode 206 can be a double-layer structure (not shown) that includes a diffusion layer and a catalyst layer. The catalyst layer is located between the diffusion layer and the proton exchange membrane, and contact with the diffusion layer and the proton exchange membrane. The diffusion layer can be a carbon nanotube structure or carbon fiber paper. The catalyst layer includes a plurality of catalyst materials and a plurality of carriers. The catalyst materials include metal particles. The metal particles can be selected from a group consisting of platinum particles, gold particles, ruthenium particles and combinations thereof. The carriers include carbon particles. The carbon particles can be comprised of a material selected from a group consisting of graphite, carbon black, carbon fiber, carbon nanotubes and combinations thereof. The distribution of the metal particles is less than 0.5 milligram per square centimeter.

The second electrode 206 can be fabricated by the following steps of: (a) providing metal particles and carbon particles, and putting them into a dispersion solution; (b) adding water and an active surface agent to the dispersion solution to obtain a catalyst slurry; and (c) coating the catalyst slurry on the carbon nanotube structure and drying the catalyst slurry, thereby forming the catalyst layer on the carbon nanotube structure to obtain the first electrode.

Figure 10:
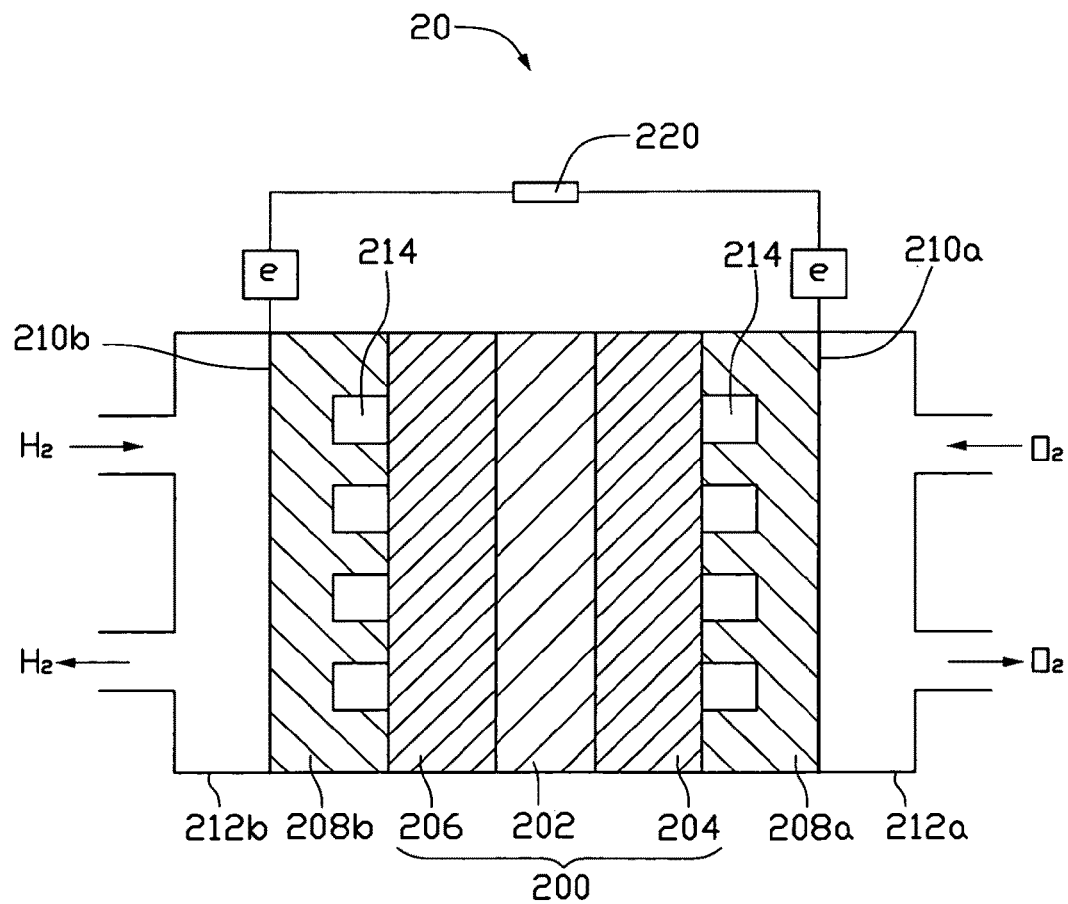
FIG. 10 is a schematic view of a fuel cell in accordance with an embodiment.

Referring to FIG. 10, a fuel cell 20 is further provided according to one embodiment. The fuel cell 20 includes a membrane electrode assembly (MEA) 200, a first flow field plates (FFP) 208a, a second flow field plates (FFP) 208b, a first current collector plate (CCP) 210a, a second current collector plate (CCP) 210b, as well as first support equipment 212a and second support equipment 212b. The membrane electrode assembly 200 can be the membrane electrode assembly (MEA) 200 provided in one of the previous embodiments.

The FFP 208a, 208b is made of metals or conductive carbon materials. The first FFP 208a is located adjacent to a surface of the first electrode 204 facing away from the proton exchange membrane 202. The second FFP 208b is located adjacent to a surface of the second electrode 206 facing away from the proton exchange membrane 202. Each FFP 208a, 208b has at least one flow field groove 214. The flow field groove 214 is contacted with the electrodes 204, 206. Thus, the flow field groove 214 is used to transport the fuel gases, the oxidant gases, and the reaction product (e.g., water).

The CCP 210a, 210b is made of conductive materials such as metal. The first CCP 210a is located adjacent to a surface of the first FFP 208a facing away from the proton exchange membrane 202. The second CCP 210b is located adjacent to a surface of the second FFP 208b facing away from the proton exchange membrane 202. Thus, the CCP 210a, 210b is used to collect and conduct the electrons generated by the work process of MEA 200.

Figure 11:
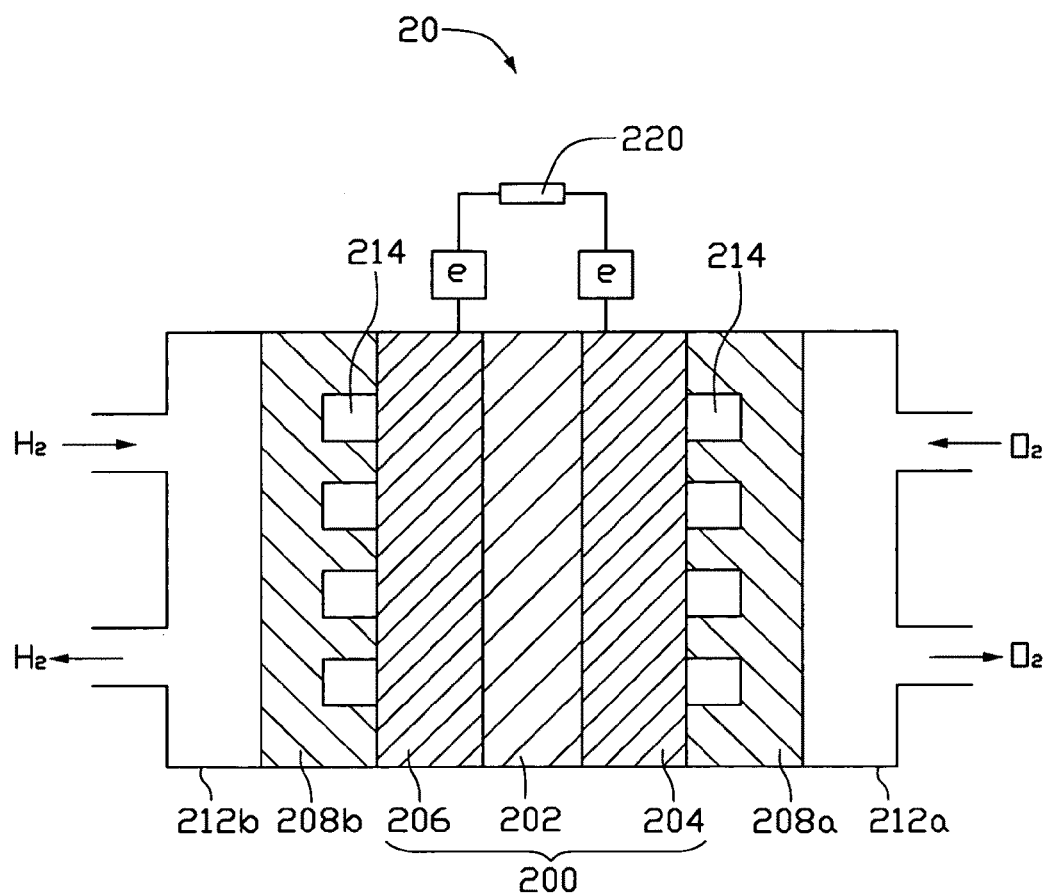
FIG. 11 is a schematic view of a fuel cell in accordance with another embodiment.
Figure 12:
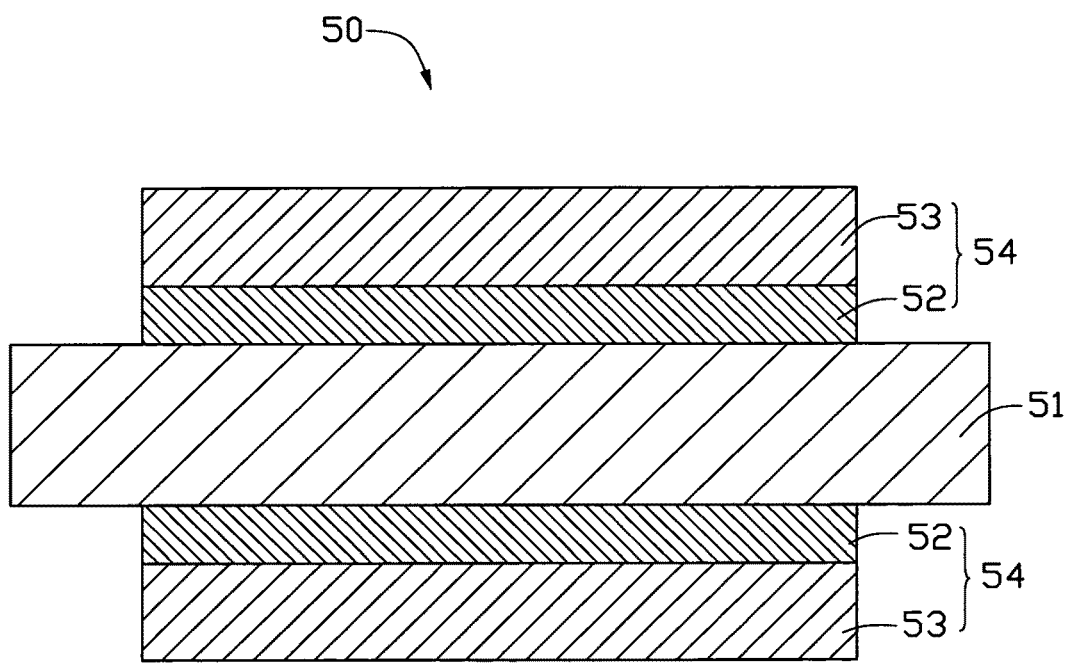
FIG. 12 is a schematic view of a membrane electrode assembly of the prior art.

Referring to FIG. 11, a fuel cell 20 is further provided according another embodiment. The fuel cell 20 has similar structure to the fuel cell 20 provided in the previous embodiments except that it has no CCP because the carbon nanotube structure has excellent conductivity and can collect and conduct the electrons. The carbon nanotube structure can perform all of the functions of the CCP, thus eliminating the need for the CCP. This will reduce the materials needed to make the fuel cell 20. In other embodiments (not shown) one CCP will be employed on one side of the proton exchange membrane 202, while the carbon nanotube structure will collect and conduct electrons on the other side.

The related support equipments 212a, 212b include blowers, valves, and pipelines. The blower is connected with the FFP 208a, 208b via pipelines. The blowers blow the fuel gases and the oxidant gases.

In the working process of the fuel cell 20, oxygen is applied to the first electrode 204 and hydrogen is applied to the second electrode 206. In the second electrode 206, after the hydrogen has been applied to the second catalyst layer 206b, a reaction of each hydrogen molecule is as follows: $H_2 \rightarrow 2H^+ + 2e$. The hydrogen ions generated by the above-described reaction reach the cathode through the proton exchange membrane 202. At the same time, the electrons generated by the reaction also arrive at the first electrode 204 by an external electrical circuit. In the first electrode 204, oxygen is also applied to the first catalyst 204b. Thus, the oxygen reacts with the hydrogen ions and electrons as shown in the following equation: $\frac{1}{2}O_2 + 2H^+ + 2e \rightarrow H_2O$. In the electrochemical reaction process, the electrons generate an electrical current, and as a result, are able to output electrical energy to the load 220.

In one embodiment, the diffusion layer includes the carbon nanotube structure. The carbon nanotube structure includes a plurality of micropores uniformly distributed therein. As such, on one side of MEA 200, the hydrogen can be effectively and uniformly diffused in the carbon nanotube structure. The hydrogen fully contacts with metal particles in the second electrode 206. Thus, the catalytic reaction activity of the metal particles with the hydrogen is enhanced. On the other side of the MEA 200, the oxidant gases are also uniformly diffused in the carbon nanotube structure, thereby fully contacting with the metal particles in the first electrode 204. Thus, the catalytic reaction activity of the metal particles with the hydrogen ions and electrons is enhanced. Due to the carbon nanotube structure having good conductivity, the electrons needed or generated in the reactions are quickly conducted by the carbon nanotube structure. This presents a more efficient membrane electrode assembly.

Finally, it is to be understood that the above-described embodiments are intended to illustrate rather than limit the disclosure. Variations may be made to the embodiments without departing from the spirit of the disclosure as claimed. The above-described embodiments illustrate the scope of the disclosure but do not restrict the scope of the disclosure.

It is also to be understood that the above description and the claims drawn to a method may include some indication in reference to certain steps. However, the indication used is only to be viewed for identification purposes and not as a suggestion as to an order for the steps.

What is claimed is:

1. A membrane electrode assembly comprising:
a proton exchange membrane comprising two surfaces; and
two electrodes separately located, on the two surfaces, wherein at least one of the two electrodes comprises a carbon nanotube composite structure, the carbon nanotube composite structure comprises a carbon nanotube structure and a catalyst material dispersed in the carbon nanotube structure;
wherein the carbon nanotube structure comprises at least one drawn carbon nanotube film, the at least one drawn carbon nanotuhe film comprises a plurality of carbon nanotube segments successively oriented along a fixed direction, and joined end-to-end by van der Waals attractive force therebetween along the fixed direction, wherein each carbon nanotube segment comprises a plurality of carbon nanotubes parallel to each other and combined by van der Waals attractive force therebetween, and a majority of the carbon nanotubes of the at least one drawn carbon nanotube film are oriented along the fixed direction.

2. The membrane electrode assembly as claimed in claim 1, wherein the carbon nanotube structure is planar.

3. The membrane electrode assembly as claimed in claim 1, wherein the carbon nanotuhe structure further comprises at least one carbon nanotube wire.

4. The membrane electrode assembly as claimed in claim 3, wherein the at least one carbon nanotube wire is an untwisted carbon nat otube wire comprising a plurality of carbon nanotubes joined end-to-end by van der Waals attractive force, the plurality of carbon nanotubes are parallel to an axis of the untwisted carbon nanotube wire.

5. The membrane electrode assembly as claimed in claim 3, wherein the at least one carbon nanotube wire is a carbon nanotube twisted wire comprising a plurality of carbon nanotubes aligned around an axis of the carbon nanotube twisted wire in a helix way.

6. The membrane electrode assembly as claimed in claim 1, wherein the carbon nanotube structure comprises a plurality of micropores distributed therein, and diameters of the micropores range from about 1 to about 10 micrometers.

7. The membrane electrode assembly as claimed in claim 1, wherein the catalyst material comprises metal particles.

8. The membrane electrode assembly as claimed in claim 7, wherein the metal particles are selected from a group consisting of platinum particles, gold particles, ruthenium particles and combinations thereof.

9. A filet cell comprising:
a first flow field plate;
a second flow field plate;
a membrane electrode assembly located between the first flow field plate and the second flow field plate, the membrane electrode assembly comprising: a proton exchange membrane comprising a first surface and a second surface opposite to the first surface;
a first electrode, located on the first surface, comprising a carbon nanotube composite structure, wherein the carbon nanotube composite structure comprises a carbon nanotube structure and catalyst material disposed in the carbon nanotube structure; and
a second electrode, located on the second surface, comprising a carbon nanotube composite structure, wherein the carbon nanotube composite structure comprises a carbon nanotube structure and catalyst material disposed in the carbon nanotube structure;
wherein the carbon nanotube structure comprises at least one drawn carbon nanotube film, the at least one carbon nanotube film comprises a plurality of carbon nanotube segments successively oriented along a fixed direction, and joined end-to-end by van der Waals attractive force therebetween along the fixed direction, wherein each carbon nanotube segment comprises a plurality of carbon nanotubes parallel to each other and combined by van der Waals attractive force therebetween, and a majority of the carbon nanotubes of the at least one drawn carbon nanotube film are oriented along the fixed direction.

10. The fuel cell as claimed in claim 9, further comprising a first current collector plate and a second current collector plate, wherein the first current collector is located on a surface of the first flow field plate and is spaced from the membrane electrode assembly, the second current collector is located on a surface of the second flow field plate and is spaced from the membrane electrode assembly.

11. The membrane electrode assembly as claimed in claim 1, wherein the carbon nanotube structure comprises two or more stacked drawn carbon nanotube films, adjacent drawn carbon nanotube films are combined with each other by van der Waals attractive force therebetween, an angle between the fixed directions of the majority of the carbon nanotubes of the two adjacent stacked drawn carbon nanotube films is in a range from about 0 degrees to about 90 degrees.

12. The fuel cell as claimed as claimed in claim 9, wherein the carbon nanotube structure comprises two or more stacked drawn carbon nanotube films, adjacent drawn carbon nanotube films are combined with each other by van der Waals attractive force therebetween, an angle between the fixed directions of the majority of the carbon nanotubes of the two adjacent stacked drawn carbon nanotube films is in a range from about 0 degrees to about 90 degrees.

13. The membrane electrode assembly as claimed in claim 1 wherein the at least one drawn carbon nanotube film is pulled out from a super-aligned carbon nanotube array located on a substrate.

* * * * *